United States Patent
Chaiken et al.

(10) Patent No.: US 7,089,433 B2
(45) Date of Patent: Aug. 8, 2006

(54) METHOD AND SYSTEM FOR OPERATING SYSTEM QUIESCENT STATE

(75) Inventors: Craig Chaiken, Pflugerville, TX (US); Muhammed K. Jaber, Round Rock, TX (US); Kendall C. Witte, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 398 days.

(21) Appl. No.: 10/672,129

(22) Filed: Sep. 26, 2003

(65) Prior Publication Data
US 2005/0071692 A1   Mar. 31, 2005

(51) Int. Cl.
*G06F 1/26* (2006.01)
(52) U.S. Cl. .................................... 713/300
(58) Field of Classification Search ............... 713/300
See application file for complete search history.

(56) References Cited

U.S. PATENT DOCUMENTS

| | | | |
|---|---|---|---|
| 5,684,952 A | 11/1997 | Stein | 395/200.1 |
| 5,754,853 A * | 5/1998 | Pearce | 713/2 |
| 6,055,643 A * | 4/2000 | Chaiken | 713/323 |
| 6,091,411 A | 7/2000 | Straub et al. | 345/333 |
| 6,553,490 B1 | 4/2003 | Kottapurath et al. | 713/2 |
| 6,654,707 B1 * | 11/2003 | Wynn et al. | 702/186 |
| 6,954,851 B1 * | 10/2005 | Natu | 713/2 |

* cited by examiner

*Primary Examiner*—Thomas Lee
*Assistant Examiner*—Albert Wang
(74) *Attorney, Agent, or Firm*—Hamilton & Terrile, LLP; Robert W. Holland

(57) ABSTRACT

Information handling system functions performed with an information handling system operating system in a quiescent state, such as ROM flashing, diagnostics BIOS warning screens and hard disc drive backup, are supported through an operating system quiescent state initiated by a simulated power down state which leaves one or more processing components of the information handling system operational. For instance, an operating system utility sets a BIOS flag and pointer so that an ACPI S3 power down state places the operating system in a quiescent state but an S3 suspend call from the operating system is intercepted and a quiescent state function called by the BIOS. Recovery of the operating system from the quiescent state is initiated with the BIOS so that a reboot of the information handling system is avoided.

22 Claims, 2 Drawing Sheets

METHOD AND SYSTEM FOR OPERATING SYSTEM QUIESCENT STATE

BACKGROUND OF THE INVENTION

1. Field of the Invention

The present invention relates in general to the field of information handling system maintenance, and more particularly to a method and system for creating an operating system quiescent state to perform maintenance on information handling system processing components.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have grown steadily in complexity both in the number and types of hardware components used to build information handling systems and in the software components that rely on these hardware components to perform desired functions. Although the increased complexity generally provides improved performance and greater functionality, it also tends to involve increased maintenance and diagnostics to ensure that components operate properly together. For instance, common maintenance upkeep tasks include performing diagnostics periodically or when problems arise, flashing read only memory (ROM), presenting warning screens by the basic input/output system (BIOS) and backing up the system hard disc drive. Increased hardware component complexity also tends to result in increased demands on the operating system that coordinates interaction between hardware components. The WINDOWS operating system has evolved over time to manage the operation of hardware components including tracking the configuration of the information handling system to coordinate communication between the components.

One difficulty that arises during maintenance and diagnostics of information handling system components is that maintenance and diagnostics operations affects operating system interaction with system components as well as interaction between components themselves. For instance, ROM flashing, performance of certain diagnostics and hard disk drive backup generally require that the operating system be placed in a quiescent state in which configuration information maintained by the operating system is held consistent. As another example, display of BIOS warning screens generally requires an operating system quiescent state so that BIOS assertion of control over the display from the operating system driver does not interrupt the function of critical driver code. The conventional method for placing an operating system into a quiescent state is to boot to a secondary operating system that manages loading and execution of maintenance or diagnostics code and then re-boot into the primary operating system to ensure proper configuration of components and complete execution of the maintenance or diagnostics code. For instance, maintenance and diagnostics on an information handling system with the WINDOWS operating system typically is performed by booting to DOS and configuring the information handling system to execute the maintenance or diagnostics function on the next reboot before loading the WINDOWS operating system. However, placing an operating system into a quiescent state and rebooting to perform maintenance and diagnostics functions generally is a slow process that delays and frustrates information handling system users.

SUMMARY OF THE INVENTION

Therefore a need has arisen for a method and system which places an operating system into a quiescent state for maintenance and diagnostics without a reboot of the information handling system.

In accordance with the present invention, a method and system are provided which substantially reduce the disadvantages and problems associated with previous methods and systems for placing an information handling system into a quiescent state. An operating system power down state creates a quiescent state that supports running of a quiescent function by intercepting the operating system power down command to components of the information handling system. The quiescent function commands the operating system to return to an operation state without requiring a reboot of the information handling system.

More specifically, a quiescent state utility associated with the operating system sets up a quiescent state to run a quiescent state function by setting a flag in the information handling system BIOS to indicate a quiescent state instead of a power down state and by setting a pointer in the BIOS to point to the quiescent state function module. The quiescent state utility then commands the operating system to enter a power down state, such as the ACPI S3 suspend state. The operating system stores component configuration information in memory and issues a power down command to the BIOS. A quiescent state module associated with the BIOS intercepts the power down command if the quiescent state flag is set and references the pointer to initiate the quiescent state function module without allowing power down off the information handling system components. The quiescent state function module performs a function that requires a quiescent state, such as ROM flash, diagnostics, maintenance, BIOS warning screen or hard disc drive backup, and then indicates recovery from the quiescent state to the BIOS. Recovery is similar to recovery from a reduced power consumption S3 state that does not require a re-boot of the information handling system.

The present invention provides a number of important technical advantages. One example of an important technical advantage is that an information handling system operating system is placed into and recovered from a quiescent state without a reboot of the system. The use of a simulated ACPI S3 reduced power consumption state places the operating system in a quiescent state similar to that achieved with a system shutdown while still keeping power to system components to allow performance of maintenance and diagnostics functions or display BIOS warning screens. Recovery from the simulated S3 state is quicker than performing a system reboot and thus reduces the delay imposed on a user by performance of maintenance and diagnostics that require an operating system quiescent state. Further, the ACPI infrastructure is generally available within information handling systems so that implementation of an operating system quiescent state without a system re-boot requires only minor modifications to existing or newly manufactured information handling systems. The operating system is placed in a quiescent state through use of the ACPI infrastructure to safely allow full control of the system for maintenance and diagnostics yet safely return the system to its initial operational state after the maintenance or diagnostics code is placed into operation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system functions that require an operating system quiescent state are performed without a system reboot by inducing an operating system quiescent state with a power down state command and intercepting operating system power down commands to components of the information handling system. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
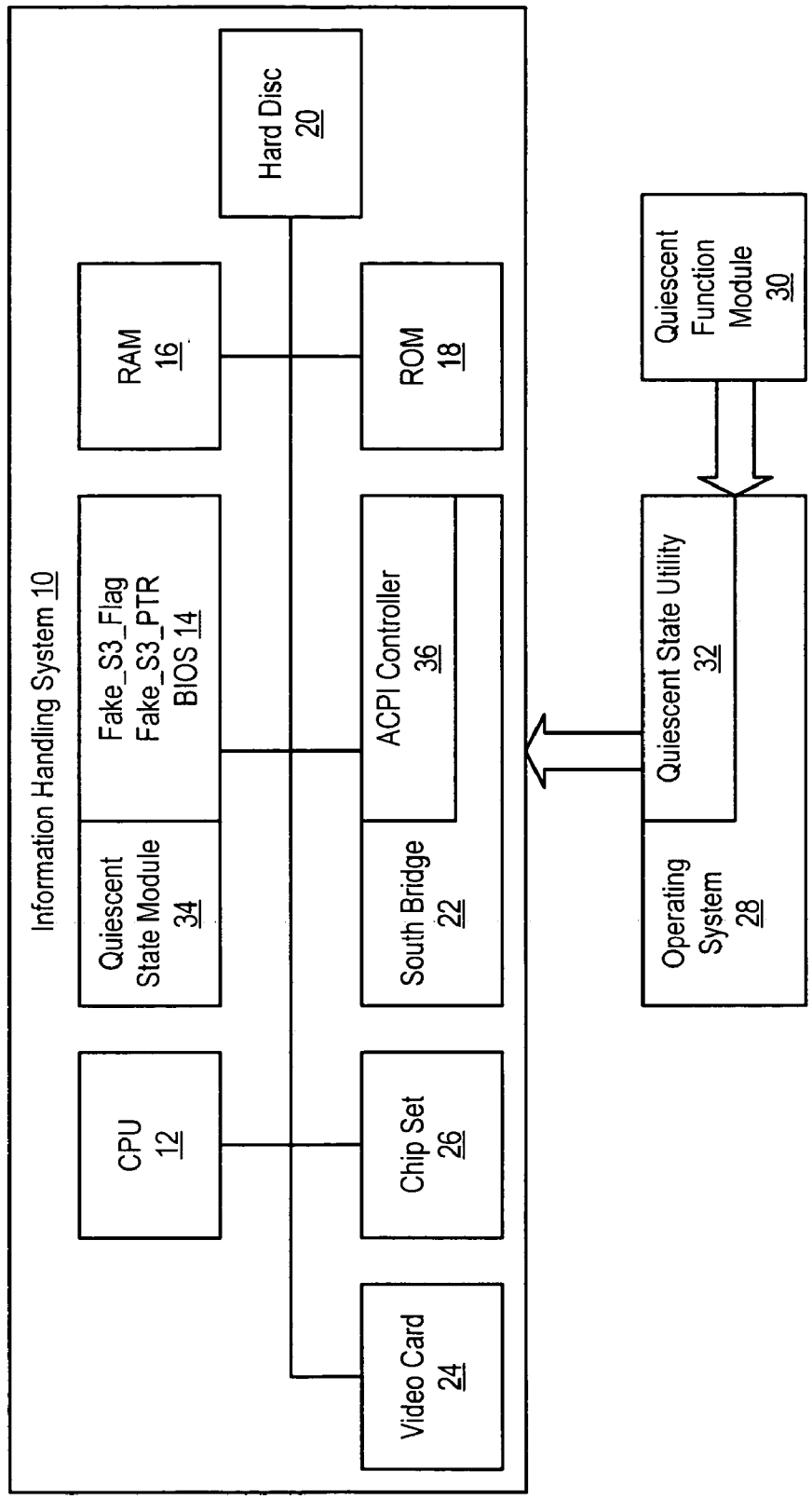
FIG. 1 depicts a block diagram of an information handling system configured to enter an operating system quiescent state.

Referring now to FIG. 1, a block diagram depicts an information handling system 10 configured to support execution of a quiescent state function without a system reboot. Information handling system 10 processes information with plural components, including a CPU 12, BIOS 14, RAM 16, ROM 18, hard disc drive 20, south bridge 22, video card 24 and chip set 26. The processing of information by the processing components is coordinated by an operating system 28, such as WINDOWS, which operates on CPU 12 with defined RAM 16 and communicates with processing components through BIOS 14. A quiescent function module 30 performs one or more functions that involve interaction with processing components and require operating system 28 to be in a quiescent state so that operating system 28 will not interfere with the quiescent function or hang-up due to configuration changes made to the processing components by the quiescent function. Quiescent functions include ROM flashing, certain diagnostics, BIOS warning screens and hard disc drive back-up. In a quiescent state, operating system 28 does not exert control over processing components and has its configuration settings saved in memory, such as hard disc drive 20. Quiescent state function module includes an operating system, such as a DOS or Linux kernel, that supports operations by quiescent function code.

Quiescent function module 30 initiates its operation by communication with a quiescent state utility 32 of operating system 28. Quiescent state utility 32 provides quiescent function information to a quiescent state module 34 of BIOS 14. The information includes a flag, FAKE_S3_FLAG, to indicate that a quiescent state is imminent and a pointer, FAKE_S3_PTR, that points to the location of quiescent function module so that BIOS 14 will be able to call quiescent function module once operating system 28 enters a quiescent state. Quiescent state utility 32 then commands operating system 28 to enter a power down state, such as the ACPI S3 suspend state. The S3 state is ordinarily used to place an information handling system into a suspend mode in which the operating system configuration is saved in RAM 16 and the majority of the remaining processing components are powered down by a D3 signal sent from BIOS 14 or and ACPI controller 36 typically located in south bridge 22. The S3 suspend state conserves power and also allows for a rapid recovery of information handling system 10 from the power down state by reinstituting operating system 28 with information from RAM 16 instead of through a re-boot.

On receipt of the S3 suspend command from quiescent state utility 32, operating system 28 saves configuration information to enter quiescence and issues a S3 suspend call to ACPI controller 36. Quiescent state module 34 has an SMM I/O trap that intercepts the suspend call to prevent power down of the components if the quiescent state flag is set. BIOS 14 then calls quiescent function module 30 at the location indicated in the quiescent state pointer and quiescent function module initiates its operations with an operating system kernel to perform the quiescent function. Code within quiescent function module 30 configures components needed to perform the function or, alternatively, BIOS 14 restores end of post configurations before calling quiescent function module 30. Memory to perform the quiescent function may be reserved by operating system 28 or also set by POST. Upon completion of the quiescent function, quiescent function module 30 signals BIOS 14 to exit the simulated S3 suspend state. In some instances, such as when the quiescent function includes diagnostics that reconfigures the CPU or chipset, BIOS 14 may execute an S3 Resume. The simulated S3 state does not require a reboot of information handling system 10 and thus allows a less intrusive, quicker and quieter quiescent function operation. In addition, with WINDOWS the use of a simulated quiescent state supports the running of legacy DOS utilities and thus reduces the cost of rewriting the utilities for operating on WINDOWS.

Figure 2:
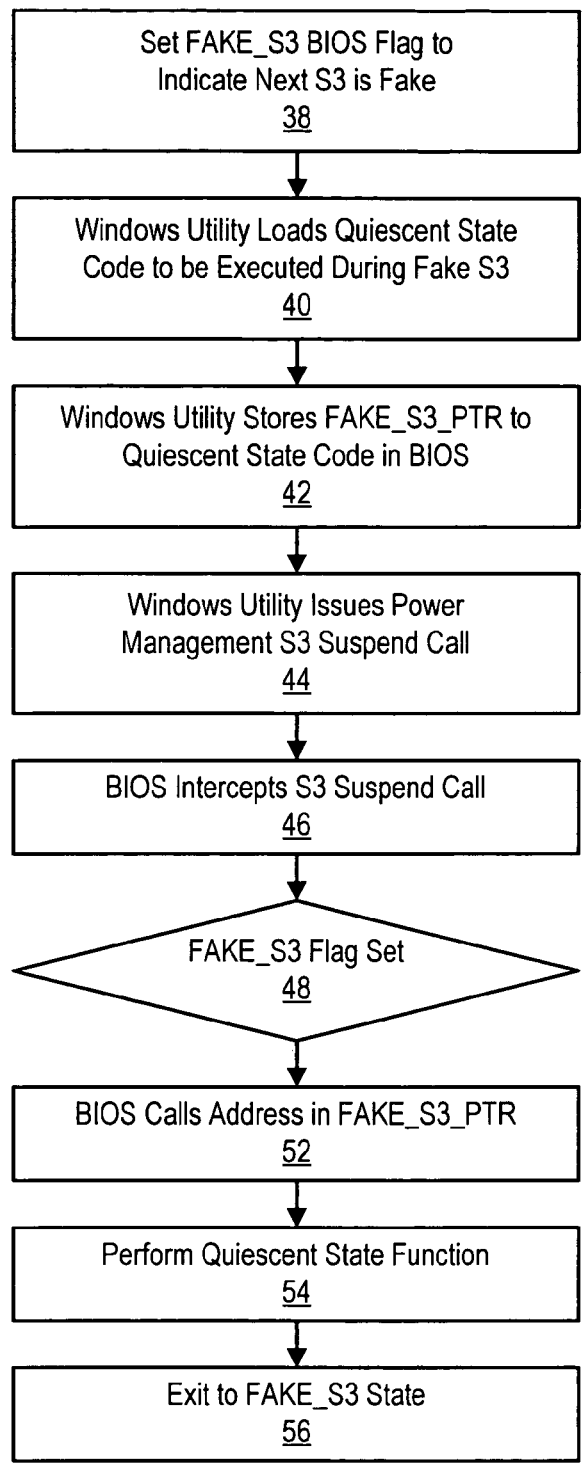
FIG. 2 depicts a method for performing information handling system maintenance and diagnostics in an operating system quiescent state.

Referring now to FIG. 2, a flow diagram depicts a process for performing a function with operating system quiescence that avoids a reboot of the information handling system. The process begins at step 38 with setting of the FAKE_S3 BIOS flag to indicate that the next S3 suspend call received at the BIOS is a fake suspend call. The process continues to step 40 at which a WINDOWS utility loads the quiescent function code to be executed once WINDOWS is in a quiescent state. At step 42, the WINDOWS utility stores the location of the quiescent function code in FAKE_S3_PTR in the BIOS. At step 44, the WINDOWS utility issues a power management S3 suspend call for WINDOWS to save configuration information and initiate power down of components in accordance with the ACPI standard. At step 46, the S3 suspend call issued from WINDOWS is intercepted by the BIOS.

At step 48, the BIOS determines if the FAKE_S3 flag is set to indicate that the operating system S3 call was fake. If the flag is not set, the process continues to step 50 for the BIOS to allow the ACPI suspend process continue so that the components of the information handling system enter the suspend state. If the flag is determined to be set at step 48 to indicate that the S3 suspend call is fake, the process continues to step 52 at which the BIOS calls the quiescent function at the location indicated by the pointer FAKE_S3_PTR. At step 54, the quiescent function executes and, at step 56, after completion of the quiescent function the BIOS exits the simulated S3 state to return the information handling system to normal operations.

Although the present invention has been described in detail, it should be understood that various changes, substitutions and alterations can be made hereto without departing from the spirit and scope of the invention as defined by the appended claims.

What is claimed is:

1. An information handling system comprising:
    plural processing components interfaced to handle information;
    an operating system operable to coordinate operation of the plural processing components and having a power down state for reducing energy consumption;
    a quiescent state function module associated with the operating system and operable to perform functions on the information handling system with the operating system in a quiescent state;
    a quiescent state module associated with one or more of the plural processing components and operable to selectively intercept a power down call from the operating system to the processing components to enter the power down state, the quiescent state module further operable to call the quiescent state function; and
    a quiescent state utility associated with the operating system and operable to configure the quiescent state module to intercept a power down call, to configure the quiescent state module to call the quiescent state function upon intercept of the power down call, and to initiate entry of the operating system to the power down state.

2. The information handling system of claim 1 wherein the quiescent state function module is further operable to command recovery of the operating system from the power down state.

3. The information handling system of claim 1 wherein the power down state comprises an ACPI S3 state.

4. The information handling system of claim 3 wherein the quiescent state module comprises a BIOS module.

5. The information handling system of claim 4 wherein the quiescent state module recovers the operating system from the S3 state with a BIOS S3 resume command.

6. The information handling system of claim 3 wherein the operating system comprises WINDOWS.

7. The information handling system of claim 5 wherein the quiescent state function module comprises an application running on DOS.

8. The information handling system of claim 1 wherein the quiescent state function module configures one or more processing components to perform the function by commanding the BIOS to restore end of POST configurations.

9. A method for running a quiescent state function on an information handling system, the method comprising:
    initiating a power down state of the operating system;
    intercepting a power down state command sent from the operating system of the information handling system to one or more components of the information handling system;
    initiating at the intercept of the power down state command a quiescent state function on the information handling system; and
    recovering the operating system from the power down state.

10. The method of claim 9 wherein the power down state comprises an ACPI S3 power down state.

11. The method of claim 10 wherein intercepting a power down state command further comprises:
    setting a flag in the BIOS to indicate that a S3 suspend call is fake;
    receiving an S3 suspend call at the BIOS;
    checking the flag to determine that the S3 suspend call is fake; and
    precluding the sending of S3 suspend commands from the BIOS to the components of the information handling system.

12. The method of claim 11 wherein initiating a power down state further comprises:
    setting a pointer in the BIOS to indicate the location of the quiescent state function; and
    calling the location of the quiescent state function after receiving the S3 suspend call and determining that the S3 suspend call is fake.

13. The method of claim 9 wherein the quiescent state function comprises a ROM flash.

14. The method of claim 9 wherein the quiescent state function comprises a hard disc drive backup.

15. The method of claim 9 wherein the quiescent state function comprises a BIOS warning screen.

16. The method of claim 9 wherein the quiescent state function comprises a diagnostics function.

17. The method of claim 16 wherein the diagnostics reconfigures a CPU or chipset of the information handling system and wherein recovering the operating system further comprises a BIOS S3.

18. A method for performing quiescent functions on an information handling system, the method comprising:
    setting a quiescent state flag in the information handling system BIOS;
    setting a quiescent function pointer in the BIOS that points to the location of a quiescent function;
    initiating a power down state with the operating system to place the operating system in a quiescent state;
    communicating the power down state to the BIOS;
    preventing power down commands from the BIOS to the information handing system components; and calling the quiescent function location to initiate the quiescent function.

19. The method of claim 18 further comprising:
configuring devices with the quiescent function.

20. The method system of claim 18 further comprising:
configuring devices to operate under the quiescent function by restoring end of POST configurations before calling the quiescent function.

21. The method of claim 18 further comprising:
reserving memory to run the quiescent function with the operating system before initiating the power down state.

22. The method of claim 18 further comprising:
reserving memory to run the quiescent function by POST.

* * * * *